A. H. PEYCKE.
SLACK ADJUSTER.
APPLICATION FILED DEC. 15, 1917.

1,329,008.

Patented Jan. 27, 1920.

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

SLACK-ADJUSTER.

1,329,008.

Specification of Letters Patent. Patented Jan. 27, 1920.

Application filed December 15, 1917. Serial No. 207,305.

*To all whom it may concern:*

Be it known that I, ARMAND H. PEYCKE, a citizen of the United States, and resident of Chicago, in the county of Cook and State of Illinois, have invented certain new and useful Improvements in Slack-Adjusters, of which the following is a specification.

This invention relates to slack adjusters.

One of the objects of my invention is to facilitate the relative adjustment of various parts of a brake rigging in accordance with requirements.

Another object is to provide simple and practical means for adjusting slack in brake mechanism.

Generally speaking, these and other objects are accomplished by providing in brake mechanism the combination of a brake lever and means carried thereby for adjusting the slack.

Figure 1:
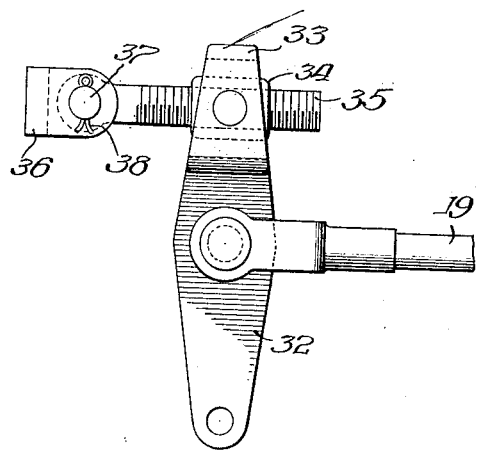
Figure 2:
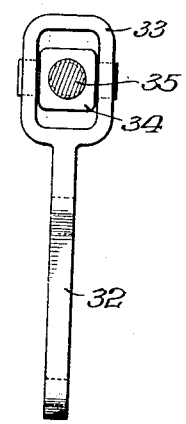

The invention is illustrated on the accompanying sheets of drawings in which,

Figure 1 is a fragmentary side elevation of a brake rigging embodying my slack adjuster; and Fig. 2 is an end view of a brake lever equipped with my slack adjuster.

It is a well appreciated fact that various parts of a brake rigging must be relatively adjusted to take up or give slack to meet the requirements for successful braking operations.

It will be noted that the dead end lever 32 has its middle portion pivotally connected to the tension rod 19 and has its upper end provided with a forked portion 33 for the reception of the trunnion member 34, the internal threaded portion of which receives a screw 35, one end of which is pivotally connected to a fixed bracket or suitable portion of the truck 36 by a pin 37 keyed in position by a cotter or other suitable key 38. If it is desired to adjust the slack the same may be accomplished by withdrawing the pin 37 and by rotating the screw 35 in either direction until the desired adjustment is made whereupon the screw 35 again may be connected to the supporting portion 36.

There may be various modifications of my invention and it is my intention to cover all such modifications which do not involve a departure from the spirit and scope of the invention as set forth in the following claims.

What I claim is:

1. In brake mechanism, the combination of a fixed member, a brake lever having spaced walls, a threaded member carried by said brake lever between the spaced walls thereof, and a threaded member carried by said fixed member, said threaded members coöperating for varying slack conditions.

2. In brake mechanism, the combination of a bracket, a brake lever having spaced walls, a threaded trunnion member carried by said brake lever between the spaced walls thereof, and a screw carried by said bracket, said threaded trunnion member and screw coöperating for varying slack conditions.

Signed at Chicago, Illinois, this 8th day of December, A. D. 1917.

ARMAND H. PEYCKE.

Witnesses:
W. A. SUTTIE,
G. V. PUGH.